United States Patent
Landa et al.

(10) Patent No.: US 11,242,841 B2
(45) Date of Patent: Feb. 8, 2022

(54) SYSTEM AND METHOD FOR CONTROLLING A WIND TURBINE BASED ON A COLLECTIVE PITCH-OFFSET

(71) Applicant: General Electric Company, Schenectady, NY (US)

(72) Inventors: Bernard Landa, Clifton Park, NY (US); Samuel Bryan Shartzer, Greenville, SC (US); Shuang Gu, Shanghai (CN)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/071,221

(22) Filed: Oct. 15, 2020

(65) Prior Publication Data

US 2021/0115897 A1  Apr. 22, 2021

(30) Foreign Application Priority Data

Oct. 22, 2019 (CN) .......................... 201911005284.2

(51) Int. Cl.
*F03D 9/00* (2016.01)
*H02P 9/04* (2006.01)
*F03D 7/02* (2006.01)
*F03D 7/04* (2006.01)

(52) U.S. Cl.
CPC ........... *F03D 7/0224* (2013.01); *F03D 7/046* (2013.01)

(58) Field of Classification Search
CPC .............................. F03D 7/0224; F03D 7/046
See application file for complete search history.

(56) References Cited

U.S. PATENT DOCUMENTS

| 8,155,920 B2 | 4/2012 | Egedal |
| 8,239,071 B2* | 8/2012 | Lausen ................... F03D 7/043 700/287 |
| 9,638,171 B2* | 5/2017 | Huang .................. F03D 7/0276 |
| 10,107,259 B2* | 10/2018 | Kristoffersen ........ F03D 7/0224 |

(Continued)

FOREIGN PATENT DOCUMENTS

| DE | 10 2016 117191 A1 | 3/2018 |
| EP | 2 063 110 B1 | 8/2015 |
| WO | WO 2017/174090 A1 | 10/2017 |

OTHER PUBLICATIONS

EPO Search Report, dated Mar. 1, 2021.

(Continued)

*Primary Examiner* — Tulsidas C Patel
*Assistant Examiner* — Thomas K Quigley
(74) *Attorney, Agent, or Firm* — Dority & Manning, P.A.

(57) ABSTRACT

A system and method are provided for controlling a wind turbine based on a collective pitch-offset. Accordingly, a wind condition acting on a rotor of the wind turbine is determined, and a first collective pitch angle for the plurality of rotor blades is set, and the wind turbine is operated. A thrust of the rotor based, at least in part, on the wind condition is determined, and an actual collective pitch angle is calculated. A collective pitch offset is determined based on the difference between the first collective pitch angle and the actual collective pitch angle. The collective pitch offset is integrated with at least one pitch setpoint command. The at least one pitch setpoint command is transmitted to a pitch control mechanism of the wind turbine.

20 Claims, 8 Drawing Sheets

(56) References Cited

U.S. PATENT DOCUMENTS

| | | | |
|---|---|---|---|
| 10,273,939 B2* | 4/2019 | Baun | F03D 7/0224 |
| 10,619,623 B2* | 4/2020 | Caponetti | F03D 7/0224 |
| 10,634,120 B2 | 4/2020 | Landa et al. | |
| 11,098,695 B2* | 8/2021 | Nielsen | F03D 9/25 |
| 2009/0263245 A1 | 10/2009 | Shi | |
| 2010/0133827 A1 | 6/2010 | Huang et al. | |
| 2010/0140940 A1 | 6/2010 | Kammer | |
| 2011/0025061 A1* | 2/2011 | Roberts | G05D 1/0866 |
| | | | 290/44 |
| 2011/0115224 A1* | 5/2011 | Lausen | F03D 7/0224 |
| | | | 290/44 |
| 2012/0078518 A1 | 3/2012 | Krishna | |
| 2013/0287568 A1 | 10/2013 | Miranda | |
| 2014/0003936 A1 | 1/2014 | Agarwal | |
| 2014/0241878 A1 | 8/2014 | Herrig | |
| 2014/0246856 A1* | 9/2014 | Santiago Benito | F03D 9/255 |
| | | | 290/44 |
| 2014/0301842 A1 | 10/2014 | Koerber et al. | |
| 2014/0328678 A1 | 11/2014 | Guadayol Roig | |
| 2014/0377064 A1* | 12/2014 | Kristoffersen | F03D 7/0224 |
| | | | 416/1 |
| 2015/0003984 A1* | 1/2015 | Pineda Amo | F03D 7/0224 |
| | | | 416/1 |
| 2016/0222946 A1 | 8/2016 | Krings | |
| 2016/0377058 A1* | 12/2016 | Caponetti | F03D 7/024 |
| | | | 416/1 |
| 2017/0306926 A1 | 10/2017 | Deshpande et al. | |
| 2018/0017042 A1* | 1/2018 | Baun | H02P 9/04 |
| 2020/0011296 A1* | 1/2020 | Caponetti | F03D 7/0224 |
| 2020/0088165 A1* | 3/2020 | Nielsen | F03D 17/00 |
| 2021/0115897 A1* | 4/2021 | Landa | F03D 7/046 |
| 2021/0207584 A1* | 7/2021 | Hammerum | F03D 7/0296 |
| 2021/0277869 A1* | 9/2021 | Vasudevan | F03D 7/0224 |

OTHER PUBLICATIONS

Wu Dinghui et al.: Fault diagnosis of pitch sensor bias for wind turbine based on the multi-innovation Kalman filter; 2016 35th Chinese Control Conference (CCC), Jul. 27, 2016 TCCT; Jul. 27, 2016, pp. 6403-6407.

* cited by examiner

SYSTEM AND METHOD FOR CONTROLLING A WIND TURBINE BASED ON A COLLECTIVE PITCH-OFFSET

FIELD

The present disclosure relates in general to wind turbines, and more particularly to systems and methods for controlling wind turbines based on a collective pitch-offset.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy the electrical energy may be transmitted to a converter and/or a transformer housed within the tower and subsequently deployed to a utility grid.

During operation, the velocity of the wind which powers the wind turbine may change. The wind turbine may, thus, adjust the pitch of the individual rotor blades about a pitch axis through, for example, a pitch adjustment mechanism. During normal operations, the pitch adjustment mechanism receives pitch commands from the turbine controller. For wind speeds below the rated threshold of the wind turbine, the turbine controller may calculate the desired pitch of the individual rotor blades so as to maximize the power produced at the given wind speed. For wind speeds above the rated threshold of the wind turbine, the turbine controller may calculate the desired pitch of the individual rotor blades so as to reduce thrust production below a specified design limit.

In order to ensure the accurate computation of the pitch commands, the pitch of the individual rotor blades must be zeroed. One approach to zeroing the rotor blades is through the establishment of a blade zero-pitch location based on a mechanical reference at the blade root. However, this approach is costly, and experience has shown that the precision of the mechanical reference may not be suitable to ensure a true zero-pitch location. Additionally, the rotor blades may be manufactured with an aerodynamic twist, which may also deviate from a nominal design value. As such, a difference may exist between the pitch angle perceived by the turbine controller and the actual, or effective, pitch angle of any individual rotor blades.

As such, the turbine controller may combine the perceived pitch angles for the rotor blades as a collective pitch angle for the rotor and utilize the collective pitch angle to compute the pitch commands. However, since a difference, or offset, may exist between the actual and perceived collective pitch angles, the resultant pitch command may result in the wind turbine operating in a sub-optimal configuration for the given wind speed.

Thus, the art is continuously seeking new and improved systems and methods that address the aforementioned issues. Accordingly, the present disclosure is directed to systems and methods for controlling a wind turbine based on a collective pitch offset.

BRIEF DESCRIPTION

Aspects and advantages of the invention will be set forth in part in the following description, or may be obvious from the description, or may be learned through practice of the invention.

In one aspect, the present disclosure is directed to a method for controlling a wind turbine based on a collective pitch-offset. The method may include determining, via a controller, a wind condition at the wind turbine. The method may also include setting a first collective pitch angle for the plurality of rotor blades mounted to a rotatable hub of a roto of the wind turbine. The method may include operating the wind turbine with the plurality of rotor blades at the first collective pitch angle. Further, the method may include determining, via the controller, a thrust of the rotor based, at least in part, on the wind condition. The method may also include calculating, via the controller, an actual collective pitch angle for the plurality of rotor blades based, at least in part, on the thrust. Additionally, the method may include determining, via the controller, the collective pitch offset based on the difference between the first collective pitch angle and the actual collective pitch angle. Further, the method may include integrating the collective pitch offset with at least one pitch setpoint command. Moreover, the method may also include transmitting, via the controller, the integrated pitch setpoint command to a pitch control mechanism of the wind turbine.

In an embodiment, determining the thrust of the rotor may include measuring, via one or more sensors, at least one of a bending strain of the tower or a deflection of the tower. The determination may also include calculating the thrust as a function of at least one of the bending strain or the deflection.

In an embodiment, calculating the actual collective pitch angle may include calculating a thrust coefficient based on the thrust of the rotor. The calculation may also include calculating a tip speed ratio for the rotor at the wind condition and deriving the actual collective pitch angle for the thrust coefficient at the tip speed ratio based on an aerodynamic performance map of the rotor. In an additional embodiment, the method may also include calculating the pitch setpoint command to optimize the thrust or power coefficient at the wind condition, wherein the wind condition may be less than a threshold value.

In an embodiment, determining the collective pitch offset is performed at least one of continuously, at a predetermined interval, or in response to a specified sensor input.

In an embodiment, the collective pitch offset is determined following at least one of a blade installation or a pitch control mechanism installation. The method may also include integrating a pitch control mechanism feedback with the collective pitch offset so as to calibrate the controller.

In a further embodiment, the method may include performing a system check with the controller so as to check for a pitch system failure. The method may include disregarding the collective pitch offset when the pitch system failure is detected. Additionally, the method may include generating at least one of a maintenance signal or a turbine shutdown signal when the pitch system failure is detected.

In an embodiment, the controller may include at least one of a turbine controller or a separate controller module communicatively coupled to the turbine controller. In a further embodiment, the method may include comparing the collective pitch offset to a collective pitch offset limit and generating an output signal to trigger a maintenance event when the collective pitch offset limit is exceeded.

In an additional embodiment, the method may also include calculating the pitch setpoint command to limit thrust production at the wind condition, wherein the wind condition may be greater than a threshold value.

In another aspect, the present disclosure is directed to a system for controlling a wind turbine. The system may include a pitch system for establishing a first collective pitch angle for a plurality of rotor blades mounted to a rotatable hub of a rotor of the wind turbine. The pitch system may also include a pitch controller. The system may further include at least one first sensor configured for monitoring a wind condition at the wind turbine and at least one second sensor for monitoring a loading condition of the wind turbine. Additionally, the system may include a turbine controller communicatively coupled to the first and second sensors and the pitch controller. The controller may include at least one processor configured to perform a plurality of operations. The plurality of operations may include, for example, setting the first collective pitch angle for the plurality of rotor blades. The plurality of operations may also include determining a thrust of the rotor based, at least in part, on the wind condition. The plurality of operations may further include calculating an actual collective pitch angle for the plurality of rotor blades based, at least in part, on the thrust. Further, the plurality of operations may include determining the collective pitch offset based on the difference between the first collective pitch angle and the actual collective pitch angle. The plurality of operations may also include integrating the collective pitch offset with the pitch setpoint command. Additionally, the plurality of operations may include transmitting the integrated pitch setpoint command to the pitch control mechanism of the wind turbine. It should be understood that the system may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
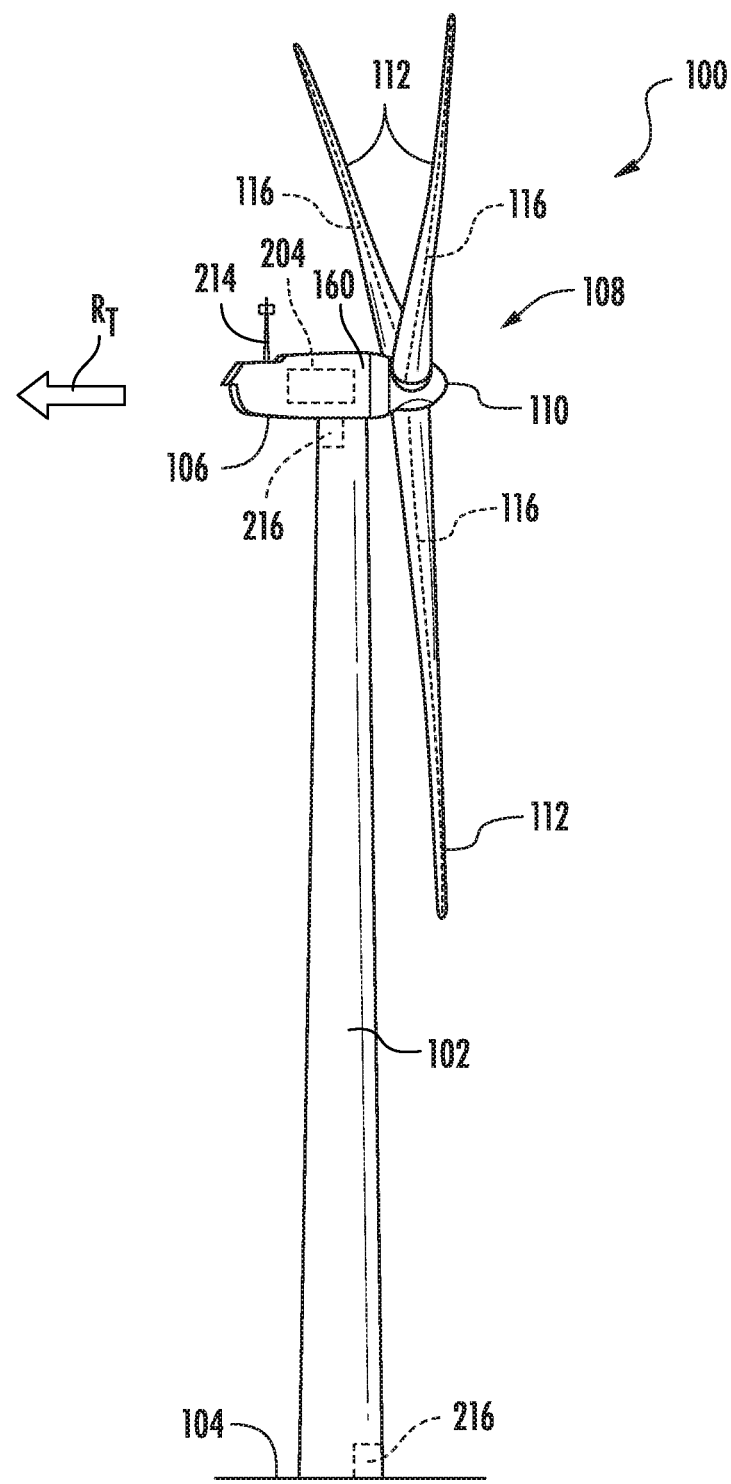
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind turbine based on a collective pitch-offset. In particular, the present disclosure may include a system and method which may facilitate the detection of a difference between a perceived collective pitch of the rotor of a wind turbine and the actual collective pitch of the rotor of the wind turbine based in part on the thrust being generated from the rotor. A collective pitch offset may be calculated by or introduced into the wind turbine's control system to account for the difference between the perceived collective pitch and the actual collective pitch of the rotor. The utilization of the collective pitch offset may facilitate the wind turbine controller operating the wind turbine at a point of maximum efficiency for a given wind speed. The utilization of the collective pitch offset may also facilitate the safe operation of the wind turbine whenever the wind speeds exceed a rated windspeed for the turbine.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, which includes an outer shell 160, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

Figure 3:
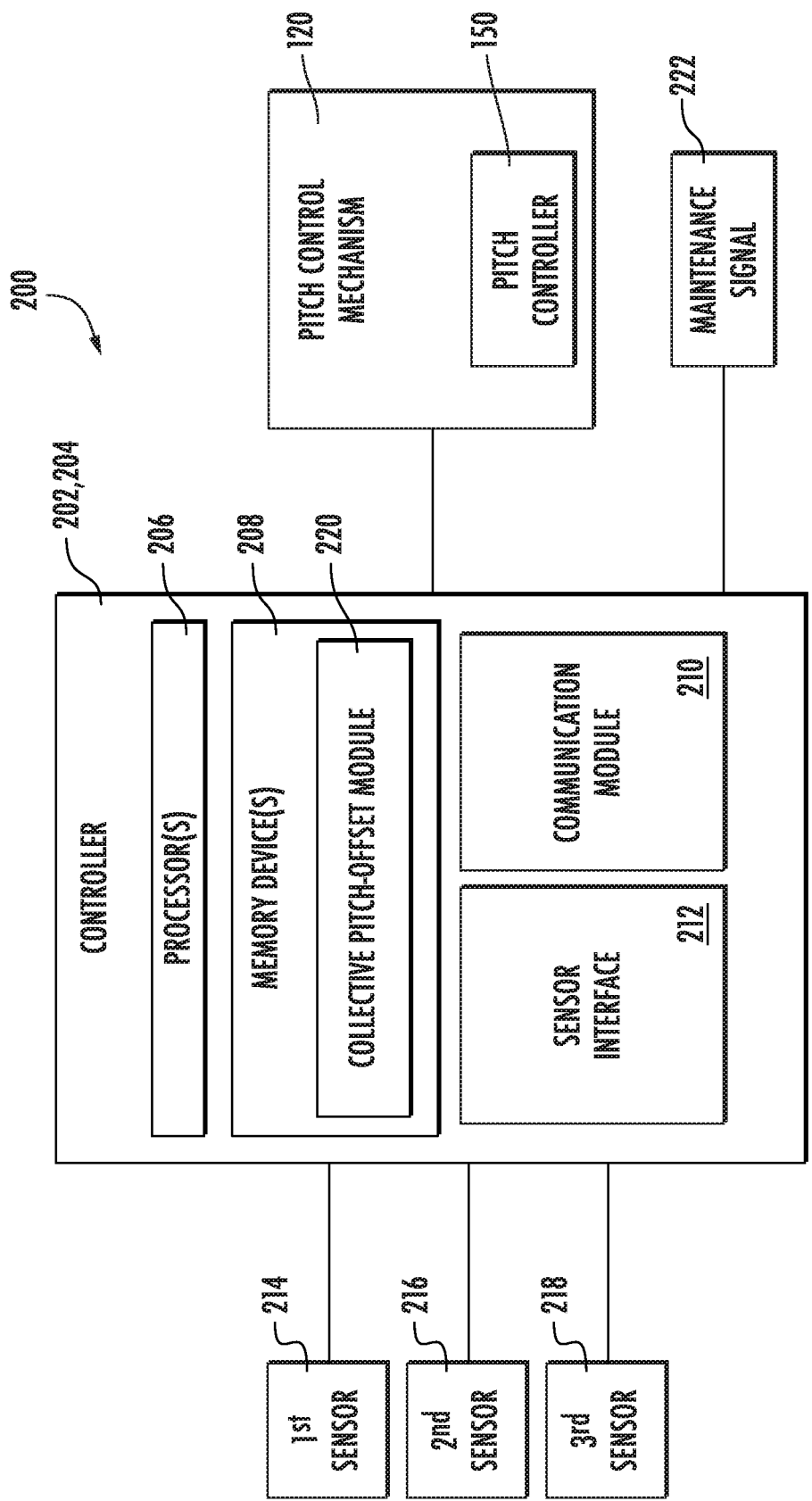
FIG. 3 illustrates a schematic diagram of one embodiment of a system for controlling a wind turbine according to the present disclosure.

The wind turbine 100 may also include a controller 202 (FIG. 3). In an embodiment, the controller 202 may be a wind turbine controller 204 centralized within the nacelle 106. However, in other embodiments, the controller 202 may be located within any other component of the wind turbine 100 or at a location outside the wind turbine. Further, the controller 202 may be communicatively coupled to any number of the components of the wind turbine 100 in order to control the components. As such, the controller 202 may include a computer or other suitable processing unit. Thus, in several embodiments, the controller 202 may include suitable computer-readable instructions that, when implemented, configure the controller 202 to perform various different functions, such as receiving, transmitting and/or executing wind turbine control signals.

Figure 2:
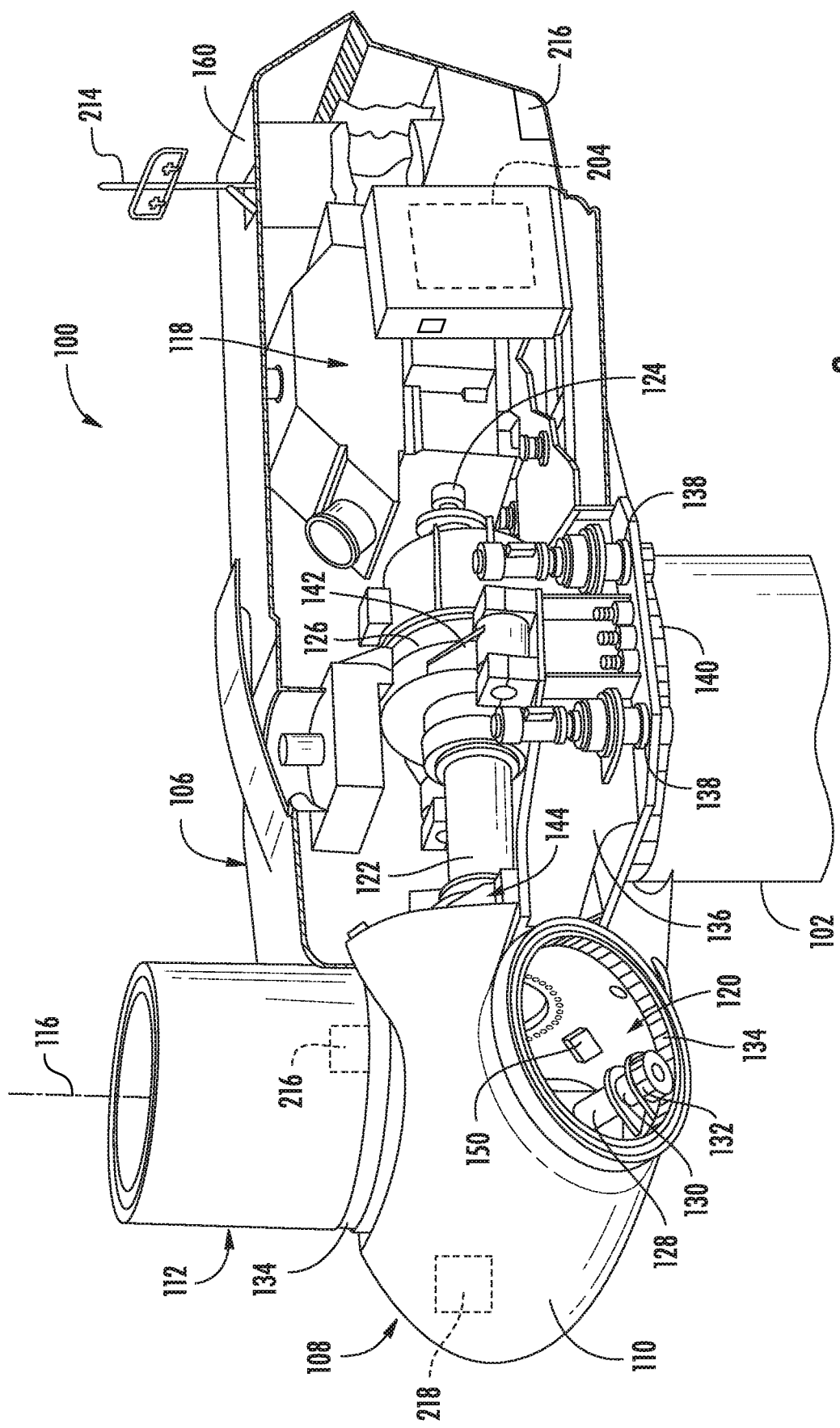
FIG. 2 illustrates a perspective, internal view of a nacelle of a wind turbine according to one embodiment of the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a generator shaft 124 of the generator 118 through a gearbox 126 connected to a bedplate support frame 136 by one or more torque arms 142. As is generally understood, the rotor shaft 122 may provide a low speed, high torque input to the gearbox 126 in response to rotation of the rotor blades 112 and the hub 110. The gearbox 126 may then be configured to convert the low speed, high torque input to a high speed, low torque output to drive the generator shaft 124 and, thus, the generator 118.

Each rotor blade 112 may also include a pitch control mechanism 120 configured to rotate each rotor blade 112 about its pitch axis 116. The pitch control mechanism 120 may include a pitch controller 150 configured to receive at least one pitch setpoint command from the controller 202. Further, each pitch control mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the controller 202, with each yaw drive mechanism(s) 138 being configured to change the angle of the nacelle 106 relative to the wind (e.g., by engaging a yaw bearing 140 of the wind turbine 100).

The rotation of each rotor blade 112 about its pitch axis 116 by its respective pitch control mechanism 120 may establish a pitch angle for each of the rotor blades 112. In an embodiment, the pitch angle may be an angular deviation from a zero-pitch location. The zero-pitch location may, for example, be established during blade installation through reliance on a mechanical reference at the blade root or a protrusion which triggers a limit switch to automate the calibration process. The controller 202 may track the pitch angle of the rotor blade(s) 112 based on a cumulative deviation from the zero-pitch location. The controller 202 may, thus, transmit the pitch setpoint command(s) to the pitch control mechanisms 120 directing that the rotor blade(s) 112 be rotated through a specified number of degrees, as interpreted by a motor mounted encoder, relative to the perceived pitch angle of the rotor blade(s) 112.

In an embodiment, the perceived pitch angle of each of the rotor blades 112 may be combined to yield a first collective pitch angle of the rotor 108. For example, if the controller 202 perceives that each of the rotor blades 112 is pitched 5-degrees from the zero-pitch location, then the first collective pitch angle of the rotor 108 would be 5-degrees. As such, the controller 202 may set the first collective pitch angle for the plurality of the rotor blades 112 by transmitting the pitch setpoint command(s) to the pitch control mechanism 120 directing that each of the rotor blades 112 be rotated a specified number of degrees.

Still referring to FIG. 2, one or more sensors 214, 216, 218 may be provided on the wind turbine 100 to monitor the performance of the wind turbine 100 and/or environmental conditions affecting the wind turbine 100. It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 202 to determine the condition.

Figure 4:
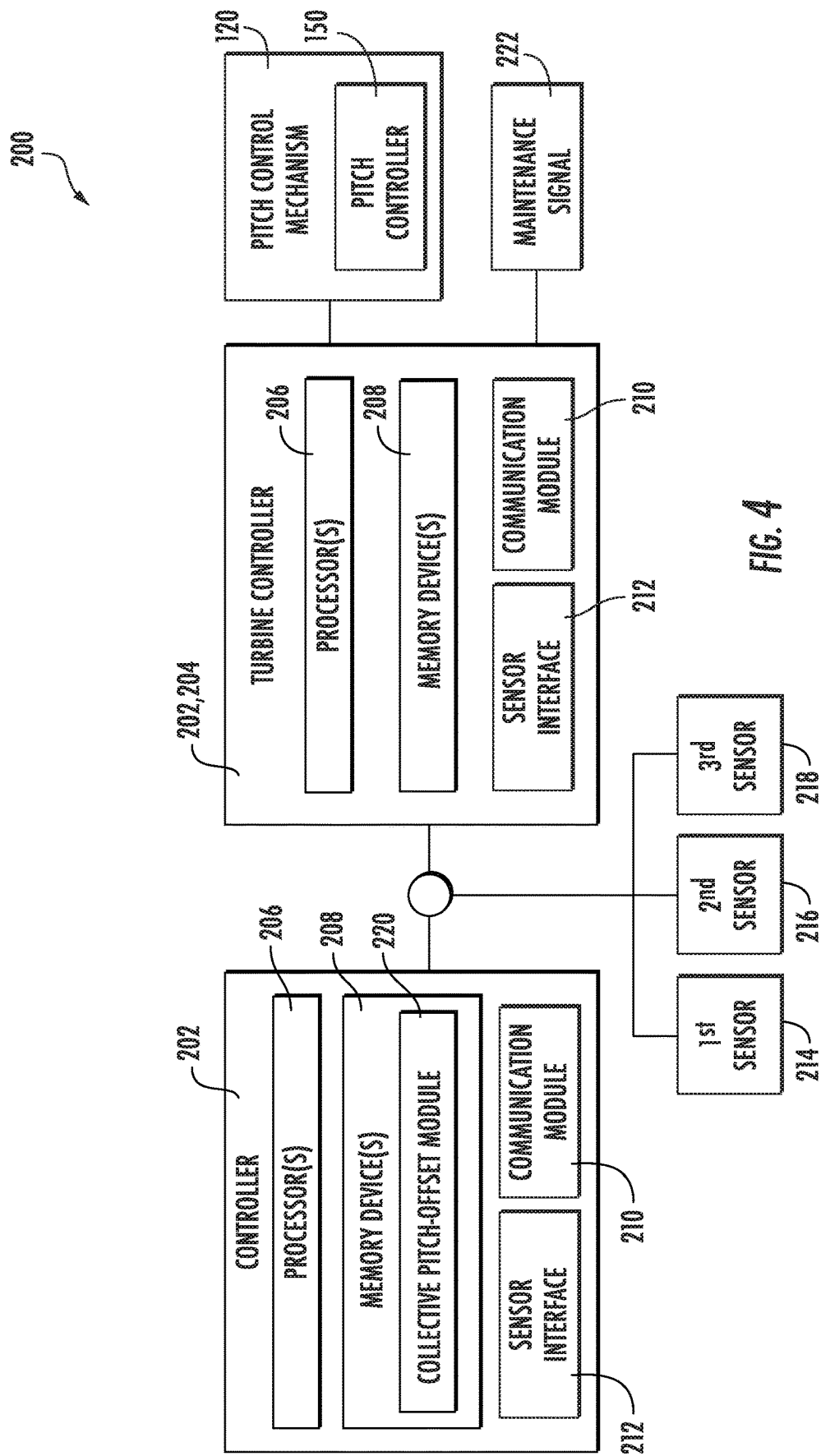
FIG. 4 illustrates a schematic diagram of another embodiment of a system for controlling a wind turbine, particularly illustrating a controller communicatively coupled to a turbine controller according to the present disclosure.

Referring now to FIGS. 3 and 4, schematic diagrams of multiple embodiments of a system 200 for controlling a wind turbine 100 according to the present disclosure are presented. As shown, suitable components may be included within the controller 202 according to the present disclosure. As shown, the controller 202 may include one or more processor(s) 206 and associated memory device(s) 208 configured to perform a variety of computer-implemented functions (e.g., performing the methods, steps, calculations and the like and storing relevant data as disclosed herein). Additionally, the controller 202 may also include a communications module 210 to facilitate communications between the controller 202 and the various components of the wind turbine 100. Further, the communications module 210 may include a sensor interface 212 (e.g., one or more analog-to-digital converters) to permit signals transmitted from one or more sensors 214, 216, 218 to be converted into signals that can be understood and processed by the processors 206. It should be appreciated that the sensors 214, 216, 218 may be communicatively coupled to the communications module 210 using any suitable means. For example, as shown in FIG. 3, the sensors 214, 216, 218 are coupled to the sensor interface 212 via a wired connection. However, in other embodiments, the sensors 214, 216, 218 may be coupled to the sensor interface 212 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 202 to perform various functions including, but not limited to, calculating a collective pitch offset and using the collective pitch offset in the control of the turbine 100, as described herein, as well as various other suitable computer-implemented functions.

As shown generally in FIGS. 1-4, the system 200 may include at least one first sensor 214 configured for monitoring a wind condition at the wind turbine or acting on the rotor 108. The first sensor(s) 214 may, for example, be a wind vane, an anemometer, a lidar sensor, or other suitable sensor. The wind condition may include and the first sensor(s) 214 may be configured to measure wind speed, wind direction, wind shear, wind gust and/or wind veer. In at least one embodiment, the first sensor(s) 214 may be mounted to the nacelle 106 at a location downwind of the rotor 108. The first sensor(s) 214 may, in alternative embodiments, be coupled to or integrated with the rotor 108. It should be appreciated that the first sensor(s) 214 may include a network of sensors and may be positioned away from the wind turbine 100.

In an embodiment, the system 200 may include at least one second sensor 216 configured for monitoring a loading condition of the wind turbine 100. For example, as shown in FIG. 1, the loading condition may be a thrust ($R_T$) developed by the rotor 108 in response to the wind condition acting thereon. For example, in an embodiment, the controller 202 may calculate the thrust ($R_T$) based on a signal relating to the blade root strain received from the second sensor(s) 216 coupled to the rotor 108.

In an embodiment, wherein it may be desirable to monitor the thrust ($R_T$) without employing sensing techniques involving the rotor 108, the second sensor(s) 216 may measure the motion of the tower 102. In such an instance, measurements of the motion or deflection of the tower 102 may serve as an acceptable proxy to thrust measurements accomplished at the rotor 108. For example, the second sensor(s) 216 may be a tower base strain sensor coupled to the tower 102 and measuring a bending moment thereof. The controller 202 may be configured to convert a measurement of tower strain at one or more locations to a thrust ($R_T$) for a given wind speed. The controller 202 may integrate the wind condition data from the first sensor(s) 214 and the tower strain data from the second sensor(s) 216 with an estimation of mechanical loads to compute the thrust ($R_T$) being produced by the rotor 108 under the wind condition.

In an additional embodiment, the second sensor(s) 216 may be an accelerometer or inclinometer measuring a tower-top acceleration or angular deflection. The second sensor(s) 216 may be a Sonic Detection and Ranging (SODAR) sensor, a Light Detection and Ranging (LIDAR) sensor, an optical sensor, or a position sensor, such as GPS, for nacelle 106 location tracking. The second sensor(s) 216 may also include combinations of sensors. For example, the GPS signal may be augmented by real-time kinematics (RTK) developed onboard or received from public servers and/or a gyro meter and/or an accelerometer. The second sensor(s) 216 may provide the controller 202 with a measurement of a deflection of the tower 102. The controller 202 may integrate the wind condition data from the first sensor(s) 214 and the tower deflection data from the second sensor(s) 216 with an estimation of mechanical loads to compute the thrust ($R_T$) being produced by the rotor 108 under the wind condition.

It should be appreciated that the second sensor(s) 216 may be coupled to the tower 102, the nacelle 106, and/or the rotor 108. The second sensor(s) 216 may also include a network of sensors and may be positioned away from the wind turbine 100. It should also be appreciated that the second sensor(s) 216 may include combinations of the sensors discussed herein. For example, the second sensor(s) 216 may include both a tower base strain sensor and a tower deflection sensor. The controller 202 may, in turn, calculate the thrust ($R_T$) as a function of at least one of the bending strain or the deflection. It should be further appreciated that increasing the quantity and types of second sensors 216 may result in more accurate or precise thrust computations from the controller 202. The controller 202 may utilize the computed thrust to calculate a thrust coefficient ($C_T$) for the rotor 108.

Referring still to FIGS. 2-4, the system 200 may also include at least one third sensor 218 configured for monitoring an environmental condition or an operating condition of the wind turbine 100. For example, the third sensor(s) 218 may be a power sensor configured to monitor the power output of the generator 118. The controller 202 may utilize the measured power output of the generator 118 to calculate a power coefficient ($C_P$) for the wind turbine 100.

In an embodiment, the third sensor(s) 218 may also include a proximity sensor, an inductive sensor, a Miniature Inertial Measurement Unit (MIMU), a pressure sensor, an accelerometer, a SODAR sensor, a LIDAR sensor, an optical sensor, or similar sensor. The third sensor(s) 218 may, for example, be configured to provide the controller 202 with measurements relating to air temperature, component temperature, air pressure, and/or rotational speed of the rotor blade(s) 112. The controller 202 may, for example, utilize a signal from the third sensor(s) 218 to calculate a tip speed ratio (TSR) for the rotor 108 at the wind condition monitored by the first sensor(s) 214. It should be appreciated that the third sensor(s) 218 may be coupled to the tower 102, the nacelle 106, and/or the rotor 108. The third sensor(s) 218 may also include a network of sensors and may be positioned away from the wind turbine 100.

In accordance with the present disclosure, the controller 202 of the system 200, such as depicted in FIGS. 3 and 4, may calculate an actual collective pitch angle for the rotor 108 based, at least in part, on the computed thrust ($R_T$). For example, in an embodiment, a collective pitch offset module 220 may derive the actual collective pitch angle for the actual thrust coefficient ($C_T$) at the tip speed ratio (TSR) based on an aerodynamic performance map of the rotor 108. Alternatively, in an embodiment, the collective pitch offset module 220 may derive the actual collective pitch angle for the actual power coefficient ($C_P$) based on the power produced by the generator 118. Graphical representations of the aerodynamic performance maps for the rotor 108 are presented in FIGS. 5 and 6. It should, however, be appreciated that the graphical representations are presented herein to aid in understanding, but that the collective pitch offset module 220 may perform the derivation through the employment of other suitable functions and/or look-up tables. Similarly, it should be appreciated that the term "plot" may include any calculations, extrapolations, derivations, graphs, or other computational steps accomplished by the collective pitch offset module 220.

Figure 5:
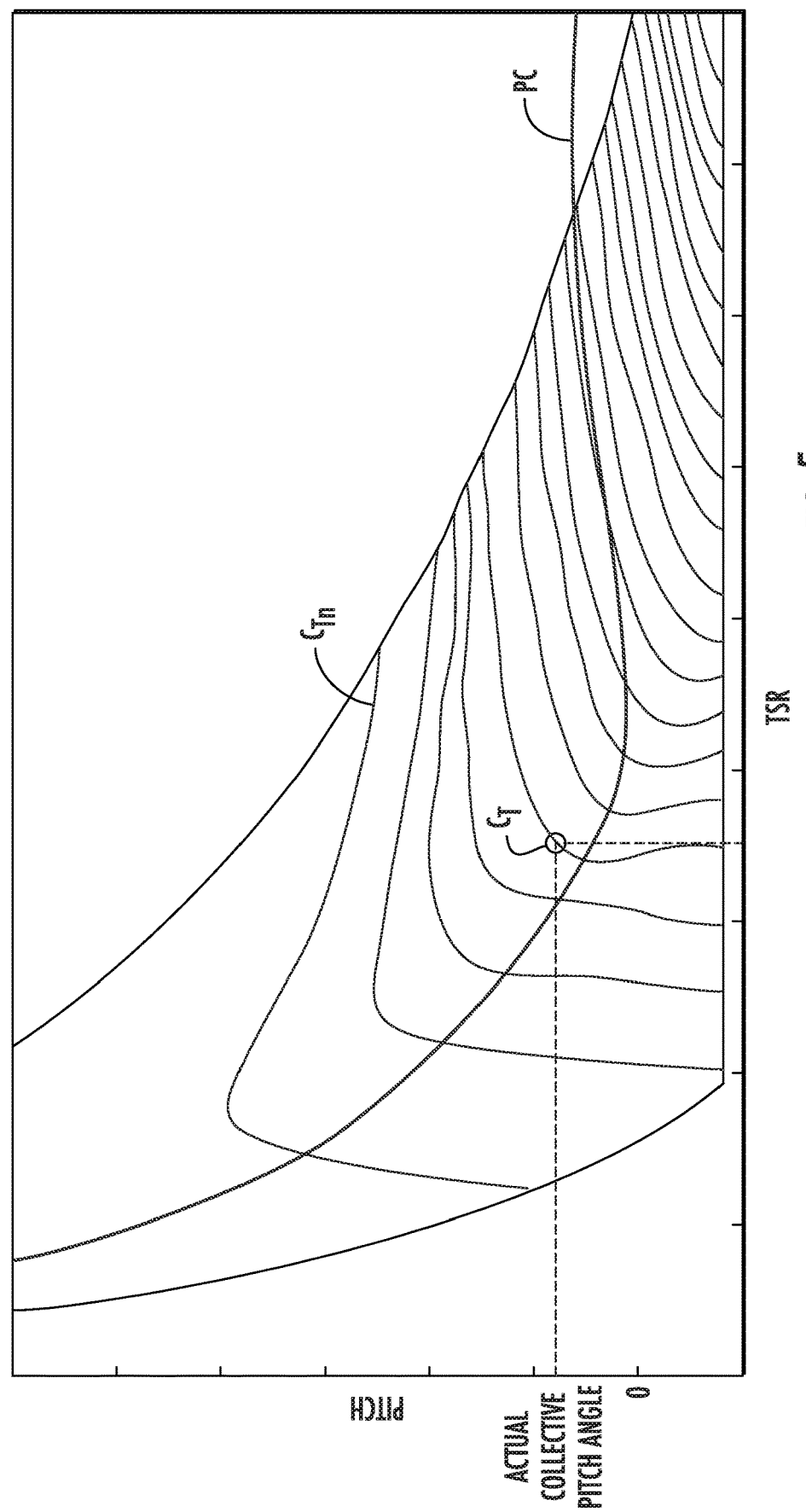
FIG. 5 illustrates one embodiment of an aerodynamic performance map particularly illustrating the optimal setpoint curve for a rotor of a wind turbine as a function of tip speed ratio and collective pitch angle overlaying a plot of thrust coefficients according to the present disclosure.

As graphically depicted in FIG. 5, the aerodynamic performance characteristics of the rotor 108 may be known through testing and/or modeling. Specifically, a pitch setpoint curve (PC) may be plotted as a function of tip speed ratio (TSR) and pitch angle. The pitch setpoint curve (PC) may be overlaid onto contours representing nominal thrust coefficient ($C_{Tn}$) values. The nominal thrust coefficient ($C_{Tn}$) values may be based on testing and/or modeling of the rotor 108. A The pitch setpoint curve (PC) may, based on the aerodynamic properties of the rotor 108, represent the optimal operating point (expressed as the coordinate (TSR, Pitch)) for the rotor 108 in response to a given wind condition. Based on these properties, at a specific tip speed ratio (TSR), the wind turbine 100 may be operating at a maximum efficiency at a pitch corresponding to the operating point lying on the pitch setpoint curve (PC). In other words, determining the point of intersection between a line representing the tip speed ratio (TSR) and the pitch setpoint curve (PC) will yield an optimal collective pitch angle for the rotor 108 when producing a desired amount of thrust.

In an embodiment, the controller 202 may compute the thrust coefficient ($C_T$) for the operating rotor 108 based on the thrust ($R_T$), which may, in turn, be calculated as a function of at least one of the bending strain or the tower deflection as monitored by the second sensor(s) 216. The thrust coefficient ($C_T$) may be plotted on the aerodynamic performance map (as depicted in FIG. 5) at the calculated tip speed ratio (TSR). The corresponding pitch angle may thus be the actual collective pitch angle of the rotor 108. In other words, by measuring the thrust ($R_T$) being produced by the rotor 108 at the measured wind condition, the controller 202 may be able to derive the actual collective pitch angle of the rotor 108 based on the known aerodynamic performance characteristics of the rotor 108.

As further depicted in FIG. 5, the computed thrust coefficient ($C_T$) based on the thrust ($R_T$) may not lie on the pitch setpoint curve (PC). Such a displacement from the pitch setpoint curve (PC) may indicate that the rotor 108 may not be optimally pitched for the wind conditions. For example, the displacement from the pitch setpoint curve (PC) may indicate that the angle of attack of the rotor blade(s) 112 may be too high or too low for the wind speed. This, in turn, may indicate that the wind turbine 100 is operating in an inefficient or potentially damaging manner.

It should be appreciated that the actual collective pitch angle may be the combination of the individual pitch angles of each of the rotor blades 112 and may be different than the first collective pitch angle perceived by the controller 202. For example, in an embodiment, the controller 202 may perceive that each rotor blade 112 has a pitch angle of 5-degrees relative to the zero-pitch location. However, due to variations in the zero-pitch location and/or the aerodynamic twist of each of the rotor blades 112, a first blade may actually have a pitch angle of 7-degrees, a second blade may actually have a pitch angle of 5-degrees, while a third blade may have a pitch angle of 6-degrees. In such an embodiment, the actual collective pitch angle of the rotor 108 would be 6-degrees. The actual collective pitch angle may be indicated by a greater or lesser thrust than would otherwise be anticipated for a rotor 108 at the first collective pitch angle and computed tip speed ratio (TSR).

Figure 6:
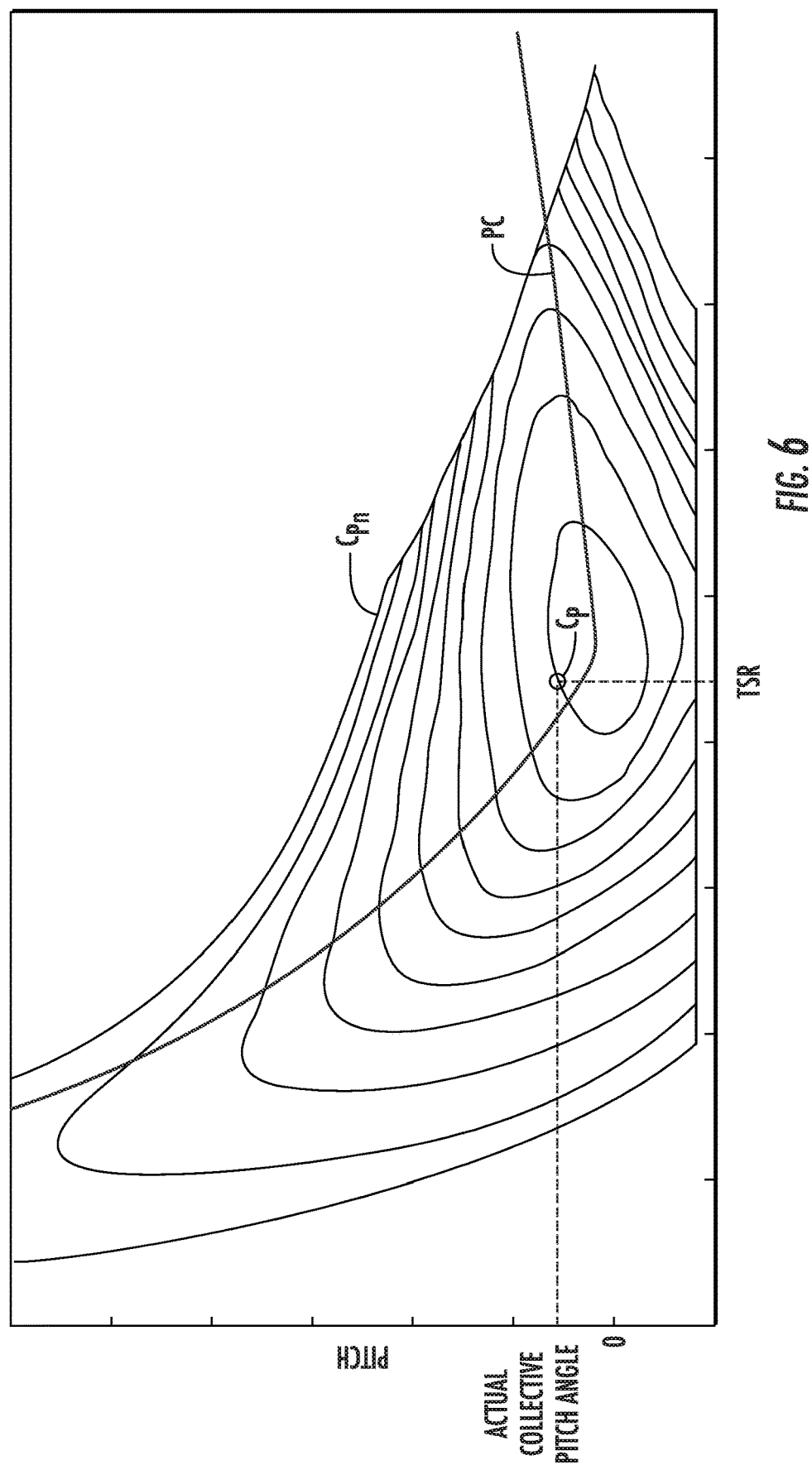
FIG. 6 illustrates one embodiment of an aerodynamic performance map particularly illustrating the optimal setpoint curve for a rotor of a wind turbine as a function of tip speed ratio and collective pitch angle overlaying a plot of power coefficients according to the present disclosure.

Similar to the previous discussion regarding FIG. 5, FIG. 6 depicts the pitch setpoint curve (PC) plotted as a function of tip speed ratio (TSR) and pitch angle. The pitch setpoint curve (PC) may be overlaid onto contours representing nominal power coefficient ($C_{Pn}$) values. The nominal power coefficient ($C_{Pn}$) values may be based on testing and/or modeling of the wind turbine 100 and may descend from a peak. The pitch setpoint curve (PC) may, based on the aerodynamic properties of the rotor 108, represent the optimal operating point (expressed as the coordinate (TSR, Pitch)) for the rotor 108 in response to a given wind condition. Based on these properties, at a specific tip speed ratio (TSR), the wind turbine 100 may be operating at a maximum efficiency at a pitch corresponding to the operating point lying on the power curve (PC). In other words, determining the point of intersection between a line representing the tip speed ratio (TSR) and the power curve (PC) will yield an optimal collective pitch angle for the rotor 108 when the wind turbine is producing a desired amount of power.

In an embodiment, the controller 202 may compute the power coefficient ($C_P$) for the operating rotor 108 based on the power output of the generator 118. The power coefficient ($C_P$) may be plotted on the aerodynamic performance map (as depicted in FIG. 6) at the calculated tip speed ratio (TSR). The corresponding pitch angle may thus be the actual collective pitch angle of the rotor 108. In other words, by measuring the power being produced by the wind turbine 100 at the measured wind condition, the controller 202 may be able to derive the actual collective pitch angle of the rotor 108 based on the known aerodynamic performance characteristics of the rotor 108.

Referring back to FIG. 3, the collective pitch offset module 220 may be a component of the wind turbine controller 204. Alternatively, as shown in FIG. 4, the collective pitch offset module 220 may be a component of a separate controller 202. In such embodiments, the utilization of a separate controller 202 may facilitate the determination of the collective pitch angle without requiring access to the software and/or hardware of the wind turbine controller 204.

In addition, in an embodiment, the collective pitch offset module 220 may be configured to execute one or more suitable data processing techniques or algorithms. The techniques or algorithms may allow the controller 202 or the wind turbine controller 204 to accurately and efficiently analyze the sensor data from the sensors 214, 216, 218. This analysis may allow the controller 202 or the wind turbine controller 204 to calculate the actual collective pitch angle for the plurality of rotor blades based, at least in part, on the thrust. Further, the collective pitch offset module 220 may apply corrections or adjustments to the received data based on the sensor type, sensor resolution, and/or other parameters associated with the wind conditions or wind turbine 100 operations. In one instances, for example, the collective pitch offset module 220 may filter the data to remove outliers, by implementing sub-routines or intermediate calculations required to calculate the collective pitch angle, and/or by performing any other desired data processing-related techniques or algorithms.

Referring particularly to FIGS. 3-6, the system 200 may calculate the actual collective pitch angle for the plurality of rotor blades 112 as described herein. The system 200 may also determine a collective pitch offset based on the difference between the first collective pitch angle and the actual collective pitch angle. The collective pitch offset may be employed as at least one of a damping factor, amplifying factor, or calibration factor.

In an embodiment, the collective pitch offset may be introduced into the system 200 at a suitable location so as to enable the efficient operation of the wind turbine 100. For example, in an embodiment, the collective pitch offset may be integrated by the turbine controller 204 with at least one pitch setpoint command. The integrated pitch setpoint command(s) may then be transmitted to the pitch control mechanism 120 of the wind turbine 100. In another embodiment, the collective pitch offset module 220 may be communicatively coupled to the pitch control mechanism 120 and may insert the collective pitch offset into a signal between the pitch control mechanism 120 and the turbine controller 204. It should be appreciated that in such an embodiment, the alteration of the signal to or from the pitch control mechanism 120 may not be detectable by the wind turbine controller 204. In yet a further embodiment, the collective pitch offset may be provided to the wind turbine controller 204 in the form of a calibration signal and may be utilized by the wind turbine controller 204 to compute a new perceived collective zero-pitch location for the rotor 108.

In an embodiment, the controller 202 may determine the collective pitch offset continuously, at a predetermined interval, and/or in response to a specified sensor input. For example, in an embodiment, the controller 202 may determine the collective pitch offset following a blade installation and/or a pitch control mechanism 120 installation. In such an embodiment, the collective pitch offset may be employed to recalibrate the wind turbine controller 204 and/or the pitch control mechanism 120. In an additional embodiment, the controller 202 may continuously monitor the actual collective pitch angle and integrate the collective pitch offset into the pitch setpoint command. In a further embodiment, the controller 202 may calculate the actual collective at a predetermined interval (e.g. daily, weekly, monthly, etc.). In yet in an additional embodiment, the receipt of a fault signal from a sensor, such as an indication relating to an unexpected output of the generator, may trigger the controller 202 to calculate the collective pitch angle of the rotor 108.

In an embodiment, the system 200 may be configured to perform a system check with the controller 202 so as to detect a pitch control mechanism 120 failure. If a failure is detected in the pitch control mechanism 120, the controller 202 may be configured to disregard the collective pitch offset and generate at least one of a maintenance signal 222 or a turbine shutdown signal.

Figure 7:
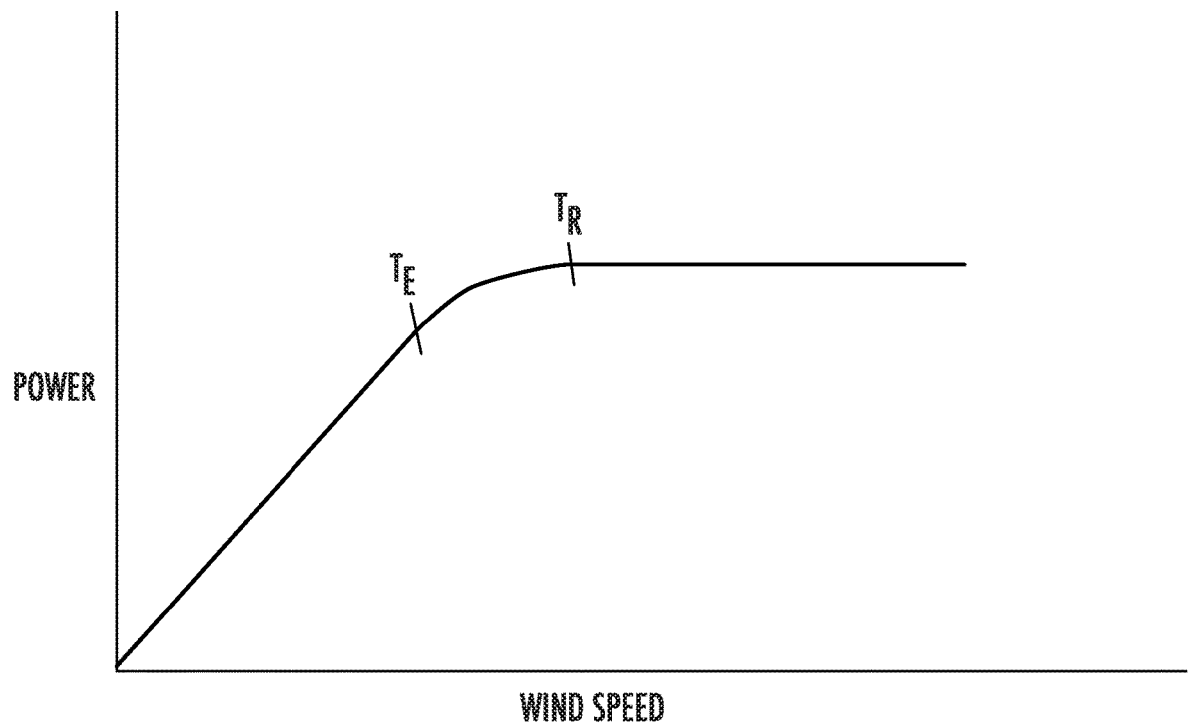
FIG. 7 illustrates a plot of one embodiment of wind turbine power output (y-axis) versus wind speed (x-axis), particularly illustrating wind speed thresholds according to the present disclosure.

Referring now to FIG. 7, an exemplary plot of one embodiment of wind turbine power output (y-axis) versus wind speed (x-axis) is illustrated according to the present disclosure. As is depicted in FIG. 7, as the wind speed increases, the power produced by the wind turbine 100, also generally increases. For wind speeds below the efficiency threshold ($T_E$), the correlation of wind speed to the power production may be relatively linear. In this region, the controller 202 may compute the pitch setpoint command(s) which seeks to optimize the power production by establishing a collective pitch angle which falls on the pitch setpoint curve (PC) depicted in FIGS. 5 and 6. As such, the controller 202 may calculate the pitch setpoint command(s) to optimize the thrust coefficient at the wind condition when the wind condition is less than the efficiency threshold ($T_E$). It should be appreciated that integrating the collective pitch offset into the pitch setpoint command(s) will facilitate operating the rotor 108 at a collective pitch angle which falls on the pitch setpoint curve.

Referring still to FIG. 7, as the wind speed increases, a rated threshold ($T_R$) may be approached. As the wind speed reaches and/or exceeds the rated threshold ($T_R$), the controller 202 may calculate the pitch setpoint command(s) which establishes the rotor 108 at a pitch angle which limits the amount of power produced by the wind turbine 100. Integrating the collective pitch offset into the pitch setpoint command(s) may ensure that the actual collective pitch angle does not result in a power production which exceeds the rated threshold ($T_R$) or an operation in an unnecessarily limited manner below the threshold (e.g. a collective pitch angle which produces less power than is permissible for the wind speed).

In the region between the efficiency threshold ($T_E$) and the rated threshold ($T_R$), the controller 202 may also calculate pitch setpoint commands which optimize efficiency while preventing the wind turbine from exceeding a thrust threshold or mechanical load limitation. It should be appreciated that employing the systems and methods disclosed herein may allow direct feedback of rotor thrust and mechanical loads management to a design limit with an improved operational certainty. It should be further appreciated that without the system and methods described herein, the controller 202 may establish pitch setpoint command(s) for this region of operation which result in loads which deviate from an anticipated load on the wind turbine. Loads which are higher than anticipated may result in damage to the wind turbine, while loads which are lower than anticipated may result in sub optimal power production.

Figure 8:
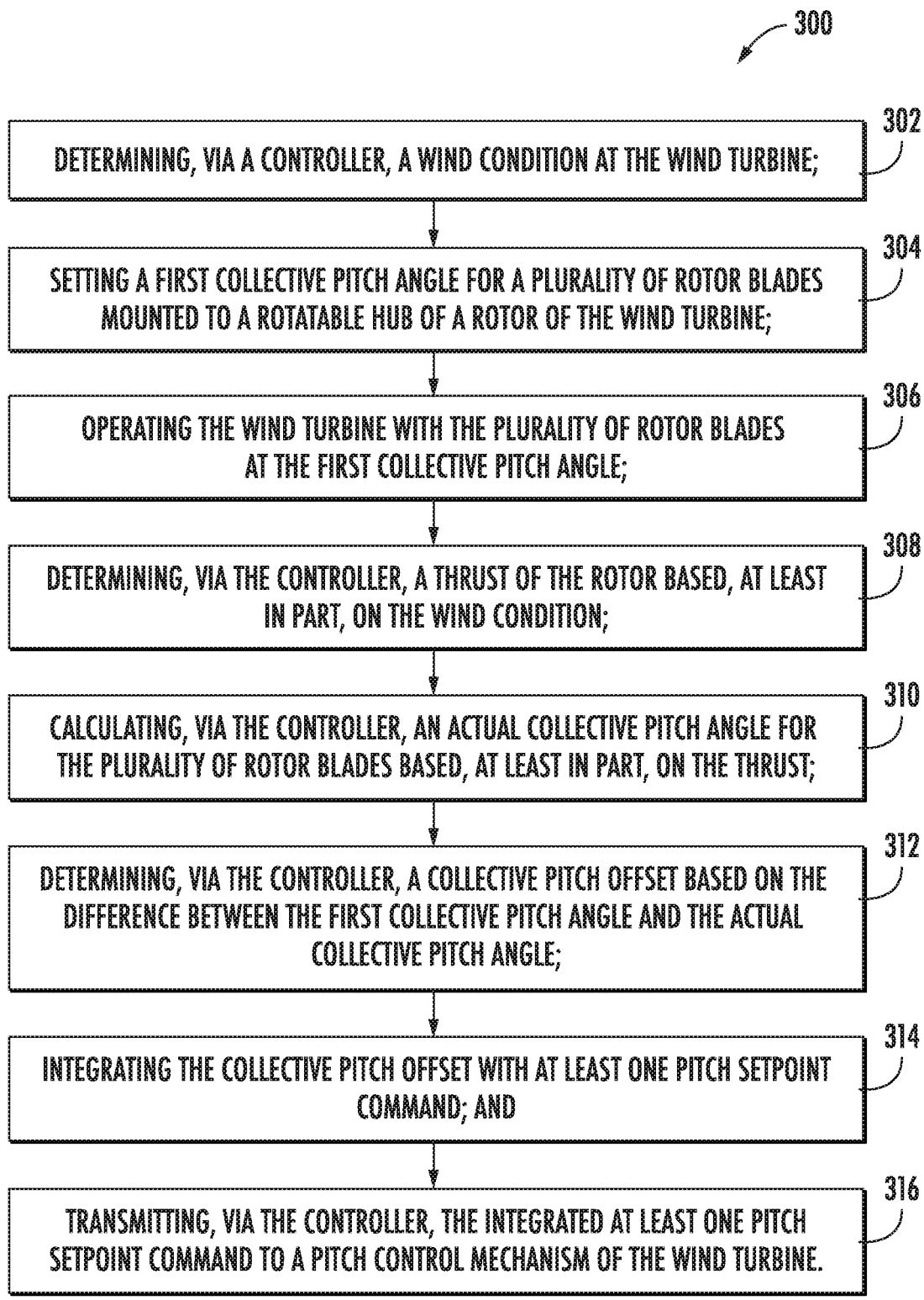
FIG. 8 illustrates a flow diagram of one embodiment of a method for controlling a wind turbine based on a collective pitch offset according to the present disclosure.

Referring now to FIG. 8, a flow diagram of one embodiment of a method 300 for controlling a wind turbine based on a collective pitch offset is illustrated. The method 300 may be implemented using, for instance, the system 200 discussed above with references to FIGS. 1-7. FIG. 8 depicts steps performed in a particular order for purposes of illustration and discussion. Those of ordinary skill in the art, using the disclosures provided herein, will understand that various steps of the method 300, or any of the methods disclosed herein, may be adapted, modified, rearranged, performed simultaneously, or modified in various ways without deviating from the scope of the present disclosure.

As shown at (302), the method 300 may include determining, via a controller, a wind condition acting on a rotor of the wind turbine. As shown at (304), the method 300 may include setting a first collective pitch angle for the plurality of rotor blades. Additionally, as shown at (306), the method 300 may include operating the wind turbine with the plurality of rotor blades at the first collective pitch angle. As shown at (308), the method 300 may include determining, via the controller, a thrust of the rotor based, at least in part, on the wind condition(s). As shown at (310), the method 300 may also include calculating, via the controller, an actual collective pitch angle for the plurality of rotor blades based, at least in part, on the thrust. Additionally, as shown at (312), the method 300 may also include determining, via the controller, the collective pitch offset based on the difference between the first collective pitch angle and the actual collective pitch angle. As shown at (314), the method 300 may also include integrating the collective pitch offset with at least one pitch setpoint command. As shown at (316), the method 300 may also include transmitting, the controller, the integrated pitch setpoint command to a pitch control mechanism of the wind turbine.

In additional embodiments, the method 300 may also, in accordance with the present disclosure, include integrating a pitch control mechanism feedback with the collective pitch offset so as to calibrate the controller.

In additional embodiments, the method 300 may also, in accordance with the present disclosure, include comparing the collective pitch offset to a collective pitch offset limit and generating an output signal to trigger a maintenance event when the collective pitch offset limit is exceeded.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling a wind turbine based on a collective pitch-offset, the method comprising determining, via a controller, a wind condition at the wind turbine, setting a first collective pitch angle for the plurality of rotor blades mounted to a rotatable hub of a rotor of the wind turbine; operating the wind turbine with the plurality of rotor blades at the first collective pitch angle; determining, via the controller, a thrust of the rotor based, at least in part, on the wind condition; calculating, via the controller, an actual collective pitch angle for the plurality of rotor blades based, at least in part, on the thrust; determining, via the controller, the collective pitch offset based on the difference between the first collective pitch angle and the actual collective pitch angle; integrating the collective pitch offset with at least one pitch setpoint command; and transmitting, via the controller, the integrated at least one pitch setpoint command to a pitch control mechanism of the wind turbine.

Clause 2. The method of any preceding clause wherein determining the thrust of the rotor further comprises: measuring, via one or more sensors, at least one of a bending strain of the tower or a deflection of the tower; and calculating the thrust as a function of at least one of the bending strain or the deflection.

Clause 3. The method of any preceding clause, wherein calculating the actual collective pitch angle comprises: calculating a thrust coefficient based on the thrust of the rotor; calculating a tip speed ratio for the rotor at the wind condition; and, deriving the actual collective pitch angle for the thrust coefficient at the tip speed ratio based on an aerodynamic performance map of the rotor.

Clause 4. The method of any preceding clause, further comprises calculating the at least one pitch setpoint command to optimize the thrust coefficient at the wind condition, wherein the wind condition is less than a threshold value.

Clause 5. The method of any preceding clause, wherein determining the collective pitch offset is performed at least one of continuously, at a predetermined interval, or in response to a specified sensor input.

Clause 6. The method of any preceding clause, wherein determining the collective pitch offset is performed following at least one of a blade installation or a pitch control mechanism installation, the method further comprising: integrating a pitch control mechanism feedback with the collective pitch offset so as to calibrate the controller.

Clause 7. The method of any preceding clause, further comprising: performing a system check with the controller so as to check for a pitch control mechanism failure; disregarding the collective pitch offset when the pitch control mechanism failure is detected; and generating at least one of a maintenance signal or a turbine shutdown signal when the pitch control mechanism failure is detected.

Clause 8. The method of any preceding clause, wherein the controller comprises at least one of a turbine controller or a separate controller module communicatively coupled to the turbine controller.

Clause 9. The method of any preceding clause, further comprising: comparing the collective pitch offset to a collective pitch offset limit; and generating an output signal to trigger a maintenance event when the collective pitch offset limit is exceeded.

Clause 10. The method of any preceding clause, further comprising calculating the at least one pitch setpoint command to limit thrust production at the wind condition, wherein the wind condition is greater than a threshold value.

Clause 11. A system for controlling a wind turbine, the system comprising: a pitch control mechanism for establishing a first collective pitch angle for a plurality of rotor blades mounted to a rotatable hub of a rotor of the wind turbine, the pitch control mechanism comprising a pitch controller; at least one first sensor configured for monitoring a wind condition at the wind turbine; at least one second sensor configured for monitoring a loading condition of the wind turbine; a turbine controller communicatively coupled to the at least one first and second sensors, and the pitch controller, the controller comprising at least one processor configured to perform a plurality of operations, the plurality of operations comprising: setting the first collective pitch angle for the plurality of rotor blades; determining a thrust of the rotor based, at least in part, on the wind condition; calculating an actual collective pitch angle for the plurality of rotor blades based, at least in part, on the thrust; determining the collective pitch offset based on the difference between the first collective pitch angle and the actual collective pitch angle; integrating the collective pitch offset with at least one pitch setpoint command; and transmitting the integrated at least one pitch setpoint command to the pitch control mechanism of the wind turbine.

Clause 12. The system of any preceding clause, wherein the at least one second sensor comprises at least one of a tower base strain sensor or a tower deflection sensor, and wherein determining the thrust of the rotor further comprises: measuring, via the at least one second sensor, at least one of a bending strain of the tower or a deflection of the tower; and calculating the thrust as a function of at least one of the bending strain or the deflection.

Clause 13. The system of any preceding clause, wherein the one or more operations further comprise: calculating a thrust coefficient based on the thrust of the rotor; calculating a tip speed ratio for the rotor at the wind condition; and deriving the actual collective pitch angle for the thrust coefficient at the tip speed ratio based on an aerodynamic performance map of the rotor.

Clause 14. The system of any preceding clause, wherein determining the collective pitch offset is performed at least one of continuously, at a predetermined interval, or in response to a specified sensor input.

Clause 15. The system preceding clause, wherein determining the collective pitch offset is performed following at least one of a blade installation or a pitch control mechanism installation, the method further comprising: integrating a pitch control mechanism feedback with the collective pitch offset so as to calibrate the controller.

Clause 16. The system of any preceding clause, wherein the one or more operations further comprise: performing a system check with the controller so as to check for a pitch control mechanism failure; disregarding the collective pitch offset when the pitch control mechanism failure is detected; and generating at least one of a maintenance signal or a turbine shutdown signal when the pitch control mechanism failure is detected.

Clause 17. The system of any preceding clause, wherein the controller comprises at least one of turbine controller or a separate controller module communicatively coupled to the turbine controller.

Clause 18. The system of any preceding clause, wherein the at least one pitch setpoint command is calculated to optimize the thrust coefficient at the wind condition, wherein the wind condition is less than a threshold value.

Clause 19. The system of any preceding clause, wherein the at least one pitch setpoint command is calculated to limit thrust production at the wind condition, wherein the wind condition is greater than a threshold value.

Clause 20. The system of any preceding clause, wherein the one or more operations further comprise: comparing the collective pitch offset to a collective pitch offset limit; and generating an output signal to trigger a maintenance event when the collective pitch offset limit is exceeded.

What is claimed is:

1. A method for controlling a wind turbine based on a collective pitch-offset, the method comprising:
    determining, via a controller, a wind condition at the wind turbine;
    setting a first collective pitch angle for a plurality of rotor blades mounted to a rotatable hub of a rotor of the wind turbine;
    operating the wind turbine with the plurality of rotor blades at the first collective pitch angle;
    determining, via the controller, a thrust of the rotor based, at least in part, on the wind condition;
    calculating, via the controller, an actual collective pitch angle for the plurality of rotor blades based, at least in part, on the thrust;
    determining, via the controller, the collective pitch offset based on the difference between the first collective pitch angle and the actual collective pitch angle;
    integrating the collective pitch offset with at least one pitch setpoint command; and
    transmitting, via the controller, the integrated at least one pitch setpoint command to a pitch control mechanism of the wind turbine.

2. The method of claim 1, wherein determining the thrust of the rotor further comprises:
    measuring, via one or more sensors, at least one of a bending strain of a wind turbine tower or a deflection of the tower; and,
    calculating the thrust as a function of at least one of the bending strain or the deflection.

3. The method of claim 1, wherein calculating the actual collective pitch angle comprises:
    calculating a thrust coefficient based on the thrust of the rotor;
    calculating a tip speed ratio for the rotor at the wind condition; and,
    deriving the actual collective pitch angle for the thrust coefficient at the tip speed ratio based on an aerodynamic performance map of the rotor.

4. The method of claim 3, further comprises calculating the at least one pitch setpoint command to optimize the thrust coefficient at the wind condition, wherein the wind condition is less than a threshold value.

5. The method of claim 1, wherein determining the collective pitch offset is performed at least one of continuously, at a predetermined interval, or in response to a specified sensor input.

6. The method of claim 1, wherein determining the collective pitch offset is performed following at least one of a blade installation or a pitch control mechanism installation, the method further comprising:
    integrating a pitch control mechanism feedback with the collective pitch offset so as to calibrate the controller.

7. The method of claim 1, further comprising:
    performing a system check with the controller so as to check for a pitch control mechanism failure;
    disregarding the collective pitch offset when the pitch control mechanism failure is detected; and,
    generating at least one of a maintenance signal or a turbine shutdown signal when the pitch control mechanism failure is detected.

8. The method of claim 1, wherein the controller comprises at least one of a turbine controller or a separate controller module communicatively coupled to the turbine controller.

9. The method of claim 8 further comprising:
    comparing the collective pitch offset to a collective pitch offset limit; and
    generating an output signal to trigger a maintenance event when the collective pitch offset limit is exceeded.

10. The method of claim 1, further comprises calculating the at least one pitch setpoint command to limit thrust production at the wind condition, wherein the wind condition is greater than a threshold value.

11. A system for controlling a wind turbine, the system comprising:
a pitch control mechanism for establishing a first collective pitch angle for a plurality of rotor blades mounted to a rotatable hub of a rotor of the wind turbine, the pitch control mechanism comprising a pitch controller;
at least one first sensor configured for monitoring a wind condition at the wind turbine;
at least one second sensor configured for monitoring a loading condition of the wind turbine;
a turbine controller communicatively coupled to the at least one first and second sensors, and the pitch controller, the controller comprising at least one processor configured to perform a plurality of operations, the plurality of operations comprising:
setting the first collective pitch angle for the plurality of rotor blades;
determining a thrust of the rotor based, at least in part, on the wind condition;
calculating an actual collective pitch angle for the plurality of rotor blades based, at least in part, on the thrust;
determining the collective pitch offset based on the difference between the first collective pitch angle and the actual collective pitch angle;
integrating the collective pitch offset with at least one pitch setpoint command; and,
transmitting the integrated at least one pitch setpoint command to the pitch control mechanism of the wind turbine.

12. The system of claim 11, wherein the at least one second sensor comprises at least one of a tower base strain sensor or a tower deflection sensor, and wherein determining the thrust of the rotor further comprises:
measuring, via the at least one second sensor, at least one of a bending strain of a wind turbine tower or a deflection of the tower; and,
calculating the thrust as a function of at least one of the bending strain or the deflection.

13. The system of claim 11, wherein the one or more operations further comprise:
calculating a thrust coefficient based on the thrust of the rotor;
calculating a tip speed ratio for the rotor at the wind condition; and
deriving the actual collective pitch angle for the thrust coefficient at the tip speed ratio based on an aerodynamic performance map of the rotor.

14. The system of claim 11, wherein determining the collective pitch offset is performed at least one of continuously, at a predetermined interval, or in response to a specified sensor input.

15. The system of claim 11, wherein determining the collective pitch offset is performed following at least one of a blade installation or a pitch control mechanism installation, the method further comprising:
integrating a pitch control mechanism feedback with the collective pitch offset so as to calibrate the controller.

16. The system of claim 11, wherein the one or more operations further comprise:
performing a system check with the controller so as to check for a pitch control mechanism failure;
disregarding the collective pitch offset when the pitch control mechanism failure is detected; and
generating at least one of a maintenance signal or a turbine shutdown signal when the pitch control mechanism failure is detected.

17. The system of claim 11, wherein the controller comprises at least one of turbine controller or a separate controller module communicatively coupled to the turbine controller.

18. The system of claim 13, wherein the at least one pitch setpoint command is calculated to optimize the thrust coefficient at the wind condition, wherein the wind condition is less than a threshold value.

19. The system of claim 11, wherein the at least one pitch setpoint command is calculated to limit thrust production at the wind condition, wherein the wind condition is greater than a threshold value.

20. The system of claim 11, wherein the one or more operations further comprise:
comparing the collective pitch offset to a collective pitch offset limit; and
generating an output signal to trigger a maintenance event when the collective pitch offset limit is exceeded.

* * * * *